United States Patent Office 2,804,461
Patented Aug. 27, 1957

2,804,461

PROCESS FOR THE MANUFACTURE OF NEW VAT DYESTUFFS

Maurice Grelat, Basel, and Walter Kern, Sissach, Switzerland, assignors to Ciba Limited, Basel, Switzerland, a Swiss firm No Drawing. Application July 2, 1956,
Serial No. 595,113

Claims priority, application Switzerland July 14, 1955

5 Claims. (Cl. 260—316)

Patent No. 2,702,294 discloses a process for the manufacture of vat dyestuffs, wherein the linear tetranthrimide of the formula

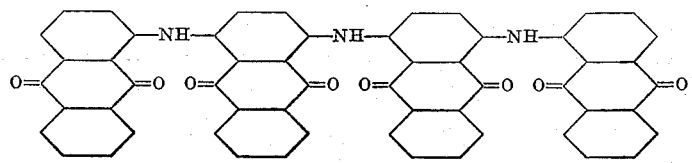

is subjected to carbazolization with aluminum chloride in the presence of a tertiary base free from hydroxyl groups, and advantageously a pyridine base. The reddish grey dyestuff obtainable by that process is distinguished by its very good fastness to light and washing, but it has the disadvantage of not being fast to chlorite.

The present invention is based on the observation that a dyestuff, which is fast to chlorite and yields grey to olive-tinged grey tints, can be obtained by carbazolyzing the linear tetranthrimide if there are used at least 2 parts, and advantageously 4–6 parts, of aluminum chloride for each part of tetranthrimide, and the corresponding quantity of a tertiary base, and the carbazolization is carried out for at least 3 hours, and advantageously 5–8 hours, at a temperature within the range of 130–150° C.

The compound of the above formula used as starting material in the present process can be prepared from 1 molecular proportion of commercial 4:4′-diamino-1:1′-dianthrimide and 2 molecular proportions of 1-chloranthraquinone, or from a 4-halogen-1:1′-dianthrimide and 4-amino-1:1′-dianthrimide, or from a 1-halogen-anthraquinone-4-amino-1:1′-4:1″-trianthrimide, by reaction in a high boiling solvent, such as nitrobenzene, with the addition of an acid-binding agent and a catalytic quantity of a copper salt or copper powder.

As an example of a tertiary base for use in the present invention there may be mentioned triethylamine. Especially suitable, however, are cyclic bases, such as quinoline or acridine, but above all pyridine bases, such as pyridine itself or its near homologues, for example, methyl-pyridines, such as α-picoline, or a mixture of pyridine bases such as the commercial β:γ-picoline mixture.

The relative proportions of the aluminum chloride and tertiary base must be so chosen that an easily stirrable melt is obtained at about 100° C. When pyridine bases are used, the ratio of aluminum chloride to tertiary base is advantageously within the range of 1:1.6 to 1:2.

The carbazolization temperature within the range of 130–150° C. is advantageously about 140° C., i. e., it should not deviate by more than a few degrees from 140° C.

The following examples illustrate the invention, the parts and percentages being by weight unless otherwise stated and the relationship of parts by weight to parts by volume being the same as that of the kilogram to the litre:

Example 1

25 parts of aluminum chloride are introduced at 10–100° C. into 50 parts of anhydrous pyridine, while stirring. At 100–110° C. there are then added 5 parts of 1:1′-4′:1″-4″:1‴-tetranthrimide. The temperature is raised to 139–141° C. in the course of 45 minutes. The whole is stirred for 6 hours at 140° C., and the reaction mixture is then poured into 1000 parts of cold water. The reaction mixture is subjected to steam distillation, and the dyestuff is filtered off with suction, washed and dried. It is a dark powder which dissolves in concentrated sulphuric acid with a brown black coloration and dyes cotton from brown vats fast olive-tinged grey tints.

Example 2

40 parts of aluminum chloride are introduced at 10–100° C. into 80 parts of anhydrous pyridine while stirring. At 100–110° C. there are then added 20 parts of 1:1′-4′:1″-4″:1‴-tetranthrimide. The temperature is raised to 139–141° C. in the course of 45 minutes. The whole is then stirred for 8 hours at 140° C., and the reaction mixture is poured into 1000 parts of cold water. The reaction mixture is subjected to steam distillation and the dyestuff is filtered off with suction, washed and dried. It is a dark powder which dissolves in concentrated sulphuric acid with a brown black coloration, and dyes cotton from brown vats fast grey tints.

Example 3

40 parts of aluminum chloride are introduced at 10–100° C. into 75 parts of anhydrous pyridine while stirring. At 100–110° C. there are then added 10 parts of 1:1′-4′:1″-4″:1‴-tetranthrimide. The temperature is raised to 139–141° C. in the course of 45 minutes. The whole is stirred for 4 hours at 140° C., and the reaction mixture is then poured into 1000 parts of cold water. The reaction mixture is subjected to steam distillation, and the dyestuff is filtered off with suction, washed and dried. It is a dark powder which dissolves in concentrated sulphuric acid with a brown-black coloration and dyes cotton from brown vats fast grey tints.

Example 4

50 parts of aluminum chloride are introduced at 20–100° C., while stirring, into 80 parts of a commercial mixture of β- and γ-picoline, which contains a small amount of dimethyl-pyridine. The whole is heated to 100° C., and then 10 parts of 1:1′-4′:4″-4″:1‴-tetranthrimide are added. The temperature is raised to 140° C. in the course of 45 minutes. The whole is stirred for 4 hours at 140° C., and the reaction mixture is poured into 2000 parts of ice. 300 parts of sodium hydroxide solution of 30 percent strength are added, and the dyestuff is filtered off with suction, washed neutral and dried.

The product is a dark powder which dissolves in concentrated sulphuric acid with a brown black coloration and dyes cotton from brown vats fast grey tints.

Example 5

1.5 parts of the dyestuff obtained as described in Example 2 are vatted with 6 parts by volume of sodium hydroxide solution of 30 percent strength and 3 parts of sodium hydrosulphite in 100 parts of water at 40–50° C. The resulting stock vat is added to a dyebath which contains in 2000 parts of water, 6 parts by volume of sodium hydroxide solution of 30 percent strength and 3 parts of sodium hydrosulphite, and 100 parts of cotton are entered at 40° C. After 15 minutes 20 parts of sodium chloride are added and dyeing is carried on at 40–50° C. for one hour. The cotton is then squeezed, oxidised and finished in the usual manner. It is dyed a fast grey tint.

What is claimed is:
1. A process for the manufacture of a vat dyestuff by the carbazolization of the linear tetranthrimide of the formula

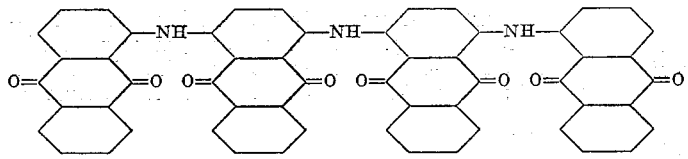

with aluminum chloride in the presence of a tertiary base free from hydroxyl groups, which comprises carrying out the carbazolization reaction with at least 2 parts of aluminum chloride for each part of tetranthrimide and a corresponding quantity of the tertiary base and for a period of at least 3 hours at a temperature within the range of 130–150° C.

2. A process for the manufacture of a vat dyestuff by the carbazolization of the linear tetranthrimide of the formula

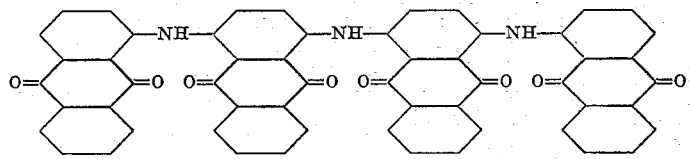

with aluminum chloride in the presence of a tertiary base free from hydroxyl groups which comprises carrying out the carbazolization reaction with at least 2 parts of aluminum chloride for each part of tetranthrimide and a corresponding quantity of a pyridine base for a period of at least 3 hours at a temperature within the range of 130–150° C.

3. A process for the manufacture of a vat dyestuff by the carbazolization of the linear tetranthrimide of the formula

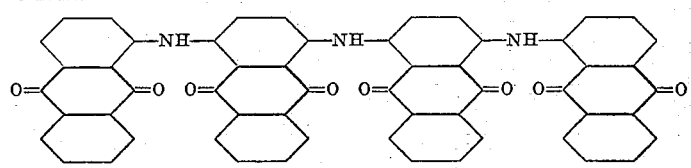

with aluminum chloride in the presence of a tertiary base free from hydroxyl groups which comprises carrying out the carbazolization reaction with at least 2 parts of aluminum chloride for each part of tetranthrimide and a corresponding quantity of a pyridine base for a period of at least 5 and at most 8 hours within the range of 130–150° C.

4. A process for the manufacture of a vat dyestuff by the carbazolization of the linear tetranthrimide of the formula

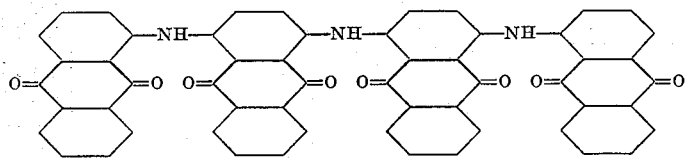

with aluminum chloride in the presence of a tertiary base free from hydroxyl groups which comprises carrying out the carbazolization reaction with at least 2 and at most 6 parts of aluminum chloride for each part of tetranthrimide and a pyridine base for a period of at least 5 and at most 8 hours at a temperature within the range of 130–150° C., the ratio of aluminum chloride to the pyridine base being within the range of 1:1.6 to 1:2.

5. A process for the manufacture of a vat dyestuff by the carbazolization of the linear tetranthrimide of the formula

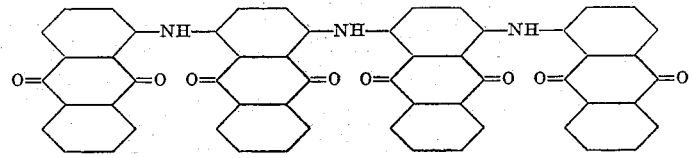

with aluminum chloride in the presence of a tertiary base free from hydroxyl groups which comprises carrying out the carbazolization reaction with at least 2 and at most 6 parts of aluminum chloride for each part of tetranthrimide and pyridine for a period of at least 5 and at most 8 hours at a temperature within the range of 130–150° C., the ratio of aluminum chloride to pyridine being within the range of 1:1.6 to 1:2.

References Cited in the file of this patent

UNITED STATES PATENTS 2,432,972     Scalera et al.     Dec. 16, 1947
2,702,294     Grelate et al.     May 26, 1950